United States Patent [19]
Anderson et al.

[11] Patent Number: 4,948,223
[45] Date of Patent: Aug. 14, 1990

[54] FIBER OPTIC SWITCH

[75] Inventors: John C. Anderson, Janetville; John C. Goodwin, Ottawa, both of Canada

[73] Assignee: Northern Telecom Limited, Montreal, Canada

[21] Appl. No.: 367,331

[22] Filed: Jun. 16, 1989

[30] Foreign Application Priority Data

Dec. 21, 1988 [CA] Canada ................................. 586587

[51] Int. Cl.$^5$ .............................................. G02B 6/36
[52] U.S. Cl. .............................. 350/96.20; 350/96.21
[58] Field of Search ................ 350/96.15, 96.20, 96.21, 350/96.29, 96.10

[56] References Cited

U.S. PATENT DOCUMENTS

| | | | |
|---|---|---|---|
| 4,204,742 | 5/1980 | Johnson et al. | 350/96.20 |
| 4,204,744 | 5/1980 | Wittmann | 350/96.20 |
| 4,212,513 | 7/1980 | Gravel | 350/96.15 |
| 4,385,799 | 5/1983 | Soref | 350/96.19 |
| 4,589,729 | 5/1986 | Bridges et al. | 350/96.32 |
| 4,652,081 | 3/1987 | Fatatry | 350/96.20 |
| 4,865,407 | 9/1989 | Suzuki et al. | 350/96.12 |

FOREIGN PATENT DOCUMENTS

| | | |
|---|---|---|
| 1091491 | 12/1980 | Canada . |
| 1093359 | 1/1981 | Canada . |
| 1101711 | 5/1981 | Canada . |
| 1113292 | 12/1981 | Canada . |
| 1119031 | 3/1982 | Canada . |

OTHER PUBLICATIONS

Ebato et al., Mechanical Fibre Optic Switching Using Bimorph, Electronic Letters, 23, Oct. 1980, vol. 16, pp. 829–830.
Laor, H., New Optical Switch Development, 7th European Conference on Optical Communications (1981), Copenhagen, p. 14-1.
Egozi, N., Laor, H., Performance Characteristics of a 16-Channel Optical Switch Using Directable Light Beams, Optical Fiber Communication Conference (1982), Pheonix, TUG 8.
Young, W. C., and Curtis, L., Moving Optical Fiber Array Switch for Multimode and Single-Mode Fibers, International Conference on Integrated Optics and Optical Fiber Communications (1981), Wednesday, Apr. 29.
Brady et al., Field-Assisted Fiber-Optic Switch, IBM Technical Disclosure Bulletin, vol. 27, No. 7, Dec. 1979.
Laor, H., Optical Switching Using Piezoelectric-driven Beams for Fiber Coupling, Optical Fiber Communication Conference (1983), Tuesday, Mar. 1.
Hale and Kompfner, Mechanical Optical-Fiber Switch, Electronics Letters, Jul. 22, 1976, vol. 12, No. 15.
Crow, J. D., Fiber-Optic Switch, IBM Technical Disclosure Bulletin, vol. 21, No. 11, Apr. 1979.
Comerford, L. D., Fiber-Optic Bypass Switch, IBM Technical Disclosure Bulletin, vol. 21, No. 10, Mar. 1979.

Primary Examiner—Frank Gonzalez
Assistant Examiner—Akm E. Ullah
Attorney, Agent, or Firm—William D. Parks

[57] ABSTRACT

A fiber optic switch of the moving fiber type and a method of making such switches. The switch has at least one stationary fiber and a mobile fiber carried by an actuator, preferably a bimorph, the end of the movable fiber being movable between a transmitting position in which the core of the mobile fiber is aligned with the core of the one stationary fiber and a position in which there is no alignment of the core of the mobile fiber with the core of the same stationary fiber. The stationary fiber is affixed to a smooth substrate surface with a slight flex downwardly between the point at which it is affixed to substrate surface and the end of the fiber which engages the substrate surface. The actuator is mounted to move in a plane substantially parallel to and above the substrate surface, and the mobile fiber is affixed to the actuator and with a downward flex between the point at which it is affixed to the actuator and the very end thereof which engages the substrate surface. The mobile fiber thus slides over the substrate on movement of the actuator. The flexed engagement of both fibers with the smooth substrate accomplishes accurate alignment of the cores of the fibers in the vertical direction, and the production of the switch with the fibers flexed as described above does not require the provision of any highly machined components.

33 Claims, 5 Drawing Sheets

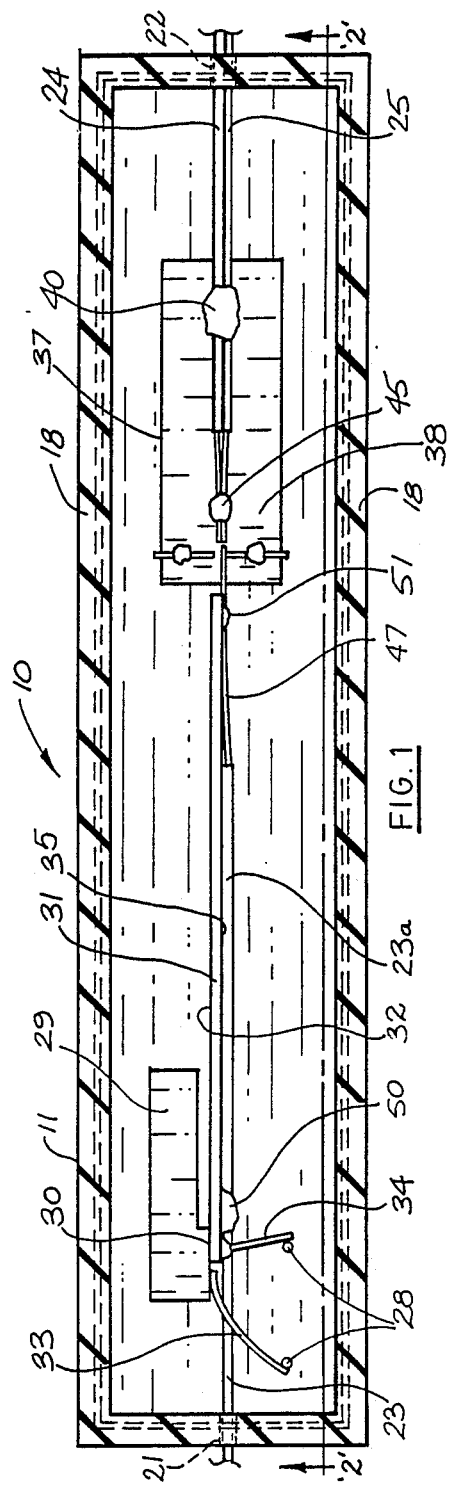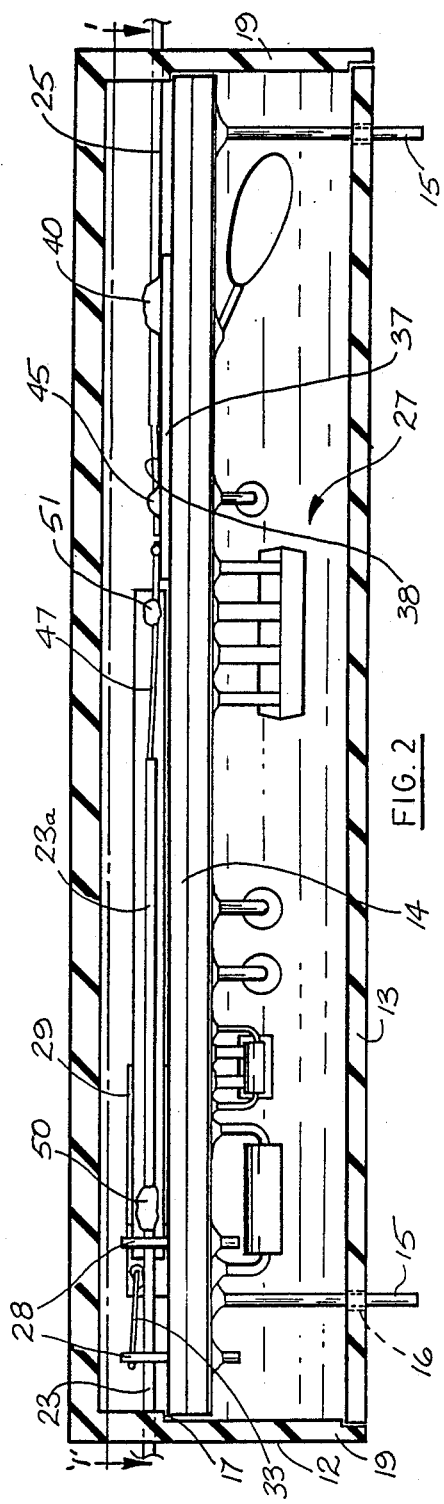

FIBER OPTIC SWITCH

BACKGROUND OF THE INVENTION

1. FIELD OF THE INVENTION

This invention relates to a fiber optic switch of the moving fiber type.

2. DESCRIPTION OF THE PRIOR ART

Fiber optic switches are now commonly used in communication networks and laboratory installations, and at the present, only mechanically activated switches offer both low cost and good crosstalk performance. In general, mechanical or electromechanical fiber optic switches can be classified in two basic types, i.e., moving beam and moving fiber. Moving beam switches include optical collimating lenses which expand the beam of light from the fibers, and then by way of movement of prisms or mirrors, the expanded beam is redirected as required in the switching process. Moving fiber switches, on the other hand, involves the actual physical movement of one or more of the fibers to specific positions to accomplish the transmission of the beam of light from one fiber end to another under selected switching conditions.

The moving beam type switches have a somewhat relaxed tolerance of movement control because of the use of the expansion lenses, but this is at the expense of a large, more complex and costly assembly which generally requires a more powerful actuator to move prisms or mirrors between switching positions. In the moving beam switches, the actuators are usually of the electromagnetic type, i.e., relays or solenoids, and therefore require significant operating power. As an example, commercially available switches, such as that know as the NEC OD-8754 optical switch, which is a moving beam type and is a single pole, double throw, (SPDT), for multi-mode fiber, although using a magnetic latching mechanism to eliminate holding power, requires switching energy for its electro-magnet in the order of 10 millijoules. Without the use of a magnetic latching mechanism significant holding power, such as fractions of a watt, is required.

In a moving fiber type switch, actuator power requirements are significantly reduced because only the small mass of the fiber itself need be moved. On the other hand, the moving fiber switches have a stringent tolerance requirement for the amount and direction of movement, the amount typically being a small portion of the fiber core diameter. In any event, the requirement of a much lower force to move the fiber has resulted in attempts to produce a SPDT switch in which a piezo-electric actuator is used. An example of such a switch is shown in a publication "Mechanical Fiber Optic Switching using P.V.D.F. Bimorph" by T. Ebato et al, Elect. Lett., Vol. 16, #22, Pg 829–830. It is indicated in this publication that the disclosed switch achieves a low loss of 0.7 dB, but it is to be noted that this is with only a 60 μm multi-mode fiber. The disclosed piezo-electric film actuator is very weak, resulting in slow switching and a fragile assemble. Moreover, the fiber registration scheme shown in the publication is not satisfactory for use in a single mode fiber arrangement. The light carrying core of a single mode fiber is typically 9 microns in diameter and therefore requires a more precise registration than is the case for a multi-mode fiber.

There are shown in two additional publications, namely "New Optical Switch Development", by H. Laor, 7th ECOC, Copenhagen 1981, P14-1, and "Performance Characteristics of a 16-Channel Optical Switch using Directable Light Beams", by H. Laor and N. Egozi, OFC'82 Phoenix, TUG 8, the use of a stronger piezo-electric actuator in the form of a bimorph cantilever as an element in a large switching array. However, the disclosed arrangement does not include a control or registration device of a nature which could be used in a single mode fiber.

As indicated above, moving fiber switches have a tolerance requirement which is critical, and in proposed switches, in which the movable fiber is moved into alignment with a stationary fiber, highly machined parts have been utilized to obtain alignment which is acceptable to avoid unacceptable loss of the transmitted signal. The cost of producing such parts and the practices which must be adopted in assembling the parts to form the switch add significantly to the cost of the product.

SUMMARY OF THE INVENTION

It is an object of the present invention to provide a movable fiber switch and the method of manufacturing such a switch for which the cost of manufacture is reasonable and yet the accuracy of alignment obtained in the product is satisfactory for using even with a single mode fiber.

One aspect of the invention resides in a fiber optic switch of the type including at least one stationary light conducting fiber and a mobile light conducting fiber having an end movable between a transmitting position aligned with the stationary fiber and a non-aligned position. A substrate which has a smooth surface is provided, and means affixes an end portion of the stationary fiber to the substrate surface with a slight downward, lengthwise flex of the fiber between the affixing means and the substrate surface to provide engagement of a short length of the circumferential surface at the very end of the stationary fiber with the substrate surface. An actuator is located for movement in a plane above and substantially parallel to the substrate surface for moving the movable end of the mobile fiber over the substrate surface between the above-mentioned positions, and means is provided affixing the mobile fiber to a point on the actuator with a slight downward, lengthwise flex of the movable end between the affixed point on the actuator and the substrate surface to provide engagement of a short length of the circumferential surface at the very end of the mobile fiber with the substrate surface. Thus, the end portion of the mobile fiber is in sliding contact with the substrate surface during movement so that the engagement of the fibers of the stationary and mobile fibers with the substrate surface provides accurate vertical alignment of the ends of the light carrying cores of the fibers when in the transmitting position.

In a specific embodiment of the invention, there is provided a lateral stop on said substrate surface and positioned to be engaged by said mobile fiber in said transmitting position for providing lateral alignment.

More specifically, a pair of said stationary conducting fibers are used, the stationary conducting fibers being affixed immediately side-by-side on said substrate surface and having end surfaces substantially in a common plane perpendicular to the substrate surface. In this form of the switch, the end of the mobile fiber aligns with one stationary fiber in one position and the other stationary fiber in a second position.

Another aspect of the invention resides in method of constructing a fiber optic switch of the type having at least one stationary conducting fiber and a mobile light conducting fiber having an end portion thereof movable between a transmitting position aligned with an end portion of the stationary fiber and a non-aligned position, the mobile fiber being moved by an actuator mounted for movement in a plane above and substantially parallel to a smooth substrate surface. The method includes the step of affixing the end portion of the stationary fiber at a point spaced from an end surface thereof to said substrate surface with a slight downward flex between the affixing point and a portion of the circumference of the fiber engaging the substrate surface adjacent the end surface of the fiber. The method further includes the step of affixing the end portion of the mobile fiber core at a point spaced from an end surface thereof to the actuator with a slight downward flex between the affixing point on the actuator and a portion of the circumference of the fiber engaging the substrate adjacent the end surface of the fiber. Thus, the portion of the mobile fiber engaging the substrate surface is in sliding contact with the substrate surface.

The method of constructing the switch may also include the step of affixing a lateral stop to said substrate surface in a position to be engaged by the mobile fiber for the purpose of providing lateral alignment of the movable fiber with the stationary fiber in operation of the switch.

BRIEF DESCRIPTION OF THE DRAWINGS

In the accompanying drawings, there is shown, as an example, one embodiment of the invention, and more particularly, FIG. 1 is a top view of the switch;

FIG. 2 is a side view of the switch;

FIG. 6 is a schematic of operating electronics of the switch;

DESCRIPTION OF PREFERRED EMBODIMENT

Figure 3:
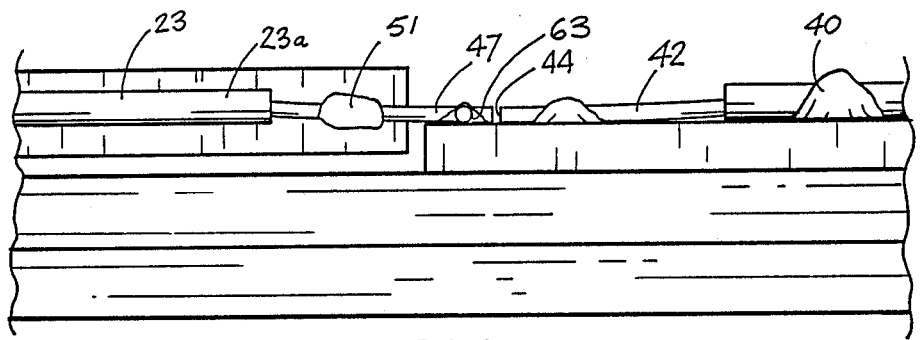
FIG. 3 is an enlarged side view of the mechanical switching portion of the embodiment of the switch shown in FIG. 1.

The reference character 10 generally denotes the switch of the present invention in the drawings, the switch 10 being shown as including a case 11, which may be formed of transparent material, such as by injection molded plastic, and is preferably mechanically stiff to allow for handling and to provide a good mounting structure for the internal parts. The outside dimensions of the complete unit, such as for PCB mounting, may typically be 0.7"×0.7"×2.5". The case 11 includes a rectangular box part 12 and a closure plate 13 enclosing the operating parts of the switch. As will be described in more detail below, the components of the switch are mounted on a flat base member 14 which may be in the form of a PCB plate, a copper side of which faces downwardly. The base member is disposed within the box part 12 and positioned against a shoulder 17 formed on the inner surface of the side walls 18 and end walls 19 of the casing. Contact pins 15, which are provided for connection to the control leads of the switch are fixed to the base member 14 and project downwardly through openings 16, in the closure plate 13. The contact pins may be mounted on 0.1" centre to allow for convenient PCB mounting by a user, or for incorporation in large arrays.

One end wall 19 of the casing 11 has an opening 21 through which an optic fiber 23 extends, but it may be appreciated that two optic fibers may extend through the opening 21, depending on the type of switch. The opposite end wall 19 also has an opening 22 receiving a plurality of optic fibers, which are shown as optic fibers 24 and 25 in the illustrated embodiment. The optic fibers 23, 24 and 25 may be of the thick jacketed type to increase the handling strength. In assembling the switch, including the placement of the closure plate 13 with the pins 15 projecting therethrough, and installing the optic fibers through the end wall, techniques are used to ensure that the switch and its operating electronics in the finished product are all completely sealed within the outer case 11.

As is most apparent from FIG. 2, the operating electronics of the switch, which are described in more detail below with reference to FIG. 6 as being in the form of bimorph conversion electronics, are shown generally at 27 assembled on the lower side of the base member 14. The output of the bimorph conversion electronics 27 is supplied to bimorph contact pins 28, 28 which extend upwardly through the base member 14 in the vicinity of a bimorph mounting upright 29 projecting upward from the base member. The upright 29 has a vertical side surface 30 which presents a copper covered face in a plane normal to the upper surface of the base member and parallel to the longitudinal axis of the case 11. A bimorph 31, which is shown as a piezo-electric ceramic bimorph actuator, is an elongated member and is affixed at one side surface 32 to the surface 30. The bimorph extends parallel to the upper surface of the base member 14 in the longitudinal direction of the case 11. A lead 33 extends from one contact pin 28 to the copper covered face of the upright 29, and a lead 34 extends from the second contact pin 28 to a side surface 35 of the bimorph which is opposite the side 32. Thus, as the voltage is supplied to the pins 28, 28, the bimorph is driven to flex in a direction which is in a plane parallel to the upper surface of the base member 14.

Attached to the upper surface of the base member 14 at the end opposite to the mounting upright 29 is a glass substrate 37 having an upper flat smooth surface 38 in the horizontal plane.

Figure 4A:
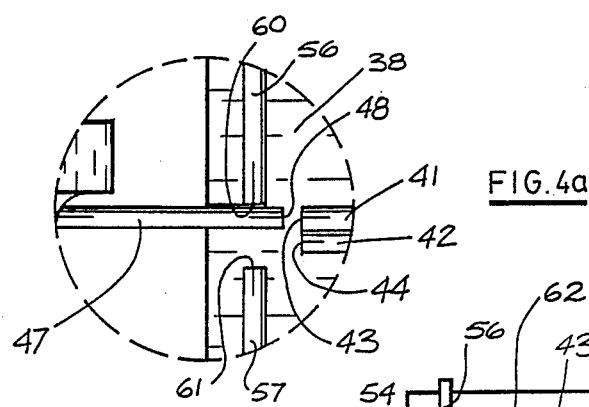
FIG. 4a is a further enlargement in the area of the fiber ends at the location identified with the dashed circle in FIG. 4.
Figure 4:
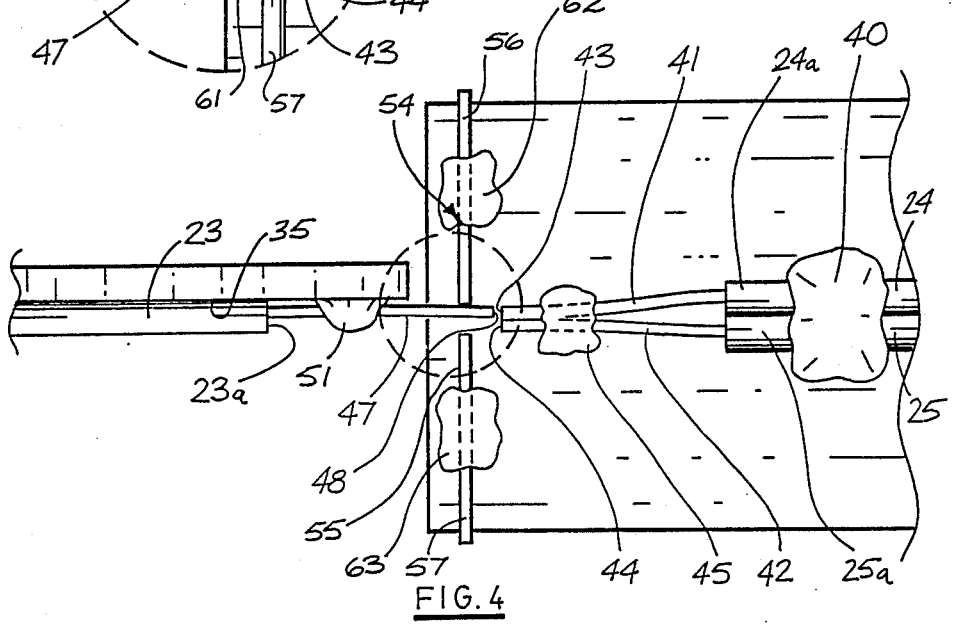
FIG. 4 is a top view of the portion of the switch shown in FIG. 3.
Figure 5:
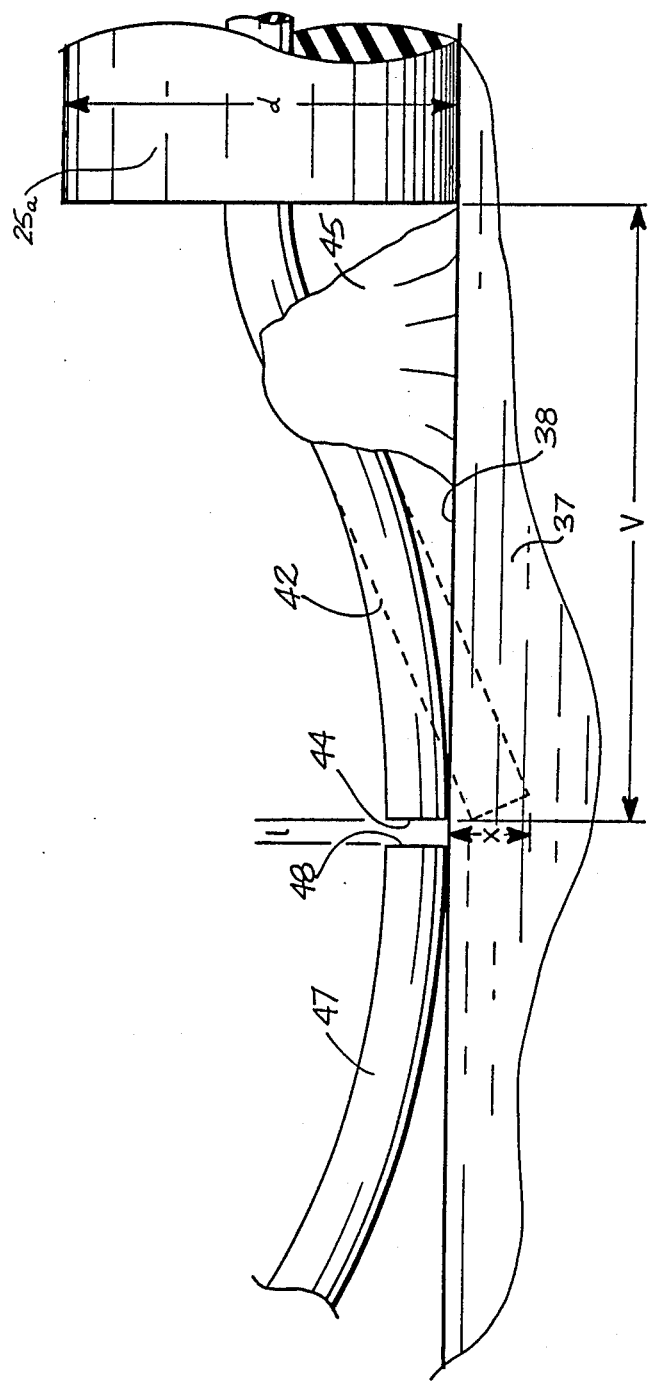
FIG. 5 is a further side view, but showing the area at the fiber ends on an additionally enlarged scale, and exaggerated in the vertical scale, to illustrate the flexing of the stripped fibers.

As is most apparent from FIGS. 1 and 4, the two optic fibers 24 and 25, which form the static side of the switch, have jackets 24a and 25a, short portions of which are stripped from the ends of the fibers 41 and 42. The distance V as shown in FIG. 5 may be in the order of 1 to 1.5 cm. The optic fibers 24 and 25 are fixed to the substrate surface by an adhesive, such as a droplet of epoxy 40 adhered to the upper surface 38, with the jackets 24a and 25a in side by side engagement and extending in the longitudinal direction of the switch. The stripped ends of fibers 41 and 42 of optic fibers 24 and 25 extend further along the substrate and are flexed toward each other and are held in side by side contacting relationship adjacent their free ends by another droplet of epoxy 45. As will be described in more detail below, the fibers 41 and 42 are further flexed downwardly so that a short length of the outer circumferential surface of fibers 41 and 42 engage the upper flat surface 38 of the substrate at the very outer free ends thereof. The outer cleaved ends 43 and 44 of the static or fixed fibers 41 and 42 are thus held immediately adjacent each other and in a substantially common vertical plane which is perpendicular to the upper surface 38 and is normal to the longitudinal axis of the switch.

The optic fiber 23 which forms the movable element of the switch also has a short portion of its jacket 23a stripped from its end so as to provide a portion of exposed fiber 47 extending from the jacket 23a to a cleaved end 48. The opening 21 in the end of the case is substantially aligned with the outer side surface 35 of the bimorph 31, and the end of the optic fiber 23 projecting into the case 11 extends along beside the surface 35. Near the end of the bimorph 31, which is affixed to the mounting upright 29, the optic fiber 23 is secured to the side surface 35 of the bimorph, such as by a droplet of epoxy 50 applied to the jacket 23a and the side surface 35. Adjacent the free end of bimorph and at a level above the upper surface 38 of the substrate 37, the fiber 47 of the optic fiber 23 is affixed to the side surface 35 by another droplet of epoxy 51. On affixing the fiber 47 to the side of the bimorph, the end of the fiber is turned slightly downward so it engages the substrate surface 38 and is flexed in the lengthwise direction. The circumferential surface of the fiber 47 at the very end of the fiber 47 is the only part of the fiber 47 which engages the substrate surface 38.

The mounting of the fixed fibers 41 and 42 in relation to the bimorph is such that the end 48 of the movable optic fiber 23 is disposed immediately in front of ends 43 and 44 of fixed optic fibers 24 and 25 with only a short space l therebetween. The end 48 of the core 47 of the movable optic fiber 23 is also accurately cleaved perpendicular to its longitudinal axis so that as the end of the fiber is flexed to the position in which the very end thereof lies flat against the surface 38 of the substrate 37, its end surface 48 is in a plane parallel to the plane in which the ends 43 and 44 of the fixed fibers 24 and 25 are disposed, i.e., in a plane perpendicular to the surface 38.

As indicated above, the end 48 of the fiber 47 faces the ends 43 and 44 of the fibers 41 and 42. In the illustrated embodiment, which is an SPDT switch, the axis of the light carrying core of the fiber 47 would be collinear with the axis of the light carrying core of one of the fibers 41 or 42, such as fiber 42, when the bimorph is not actuated, and would move to the collinear position relative to the light carrying core of the other fiber 41 when the bimorph receives its actuating voltage via leads 33 and 34. During the movement of fiber 47 from one position to the other, vertical alignment between the opposed ends, i.e, 48 and 44 or 48 and 43, is ensured because the circumferential end portion of fiber 47 slides along the smooth surface 38 immediately in front of the ends 43 and 44. The slightly flexed condition of the fiber 47 ensures engagement of the fiber with the smooth substrate surface, and thus, the vertical alignment. Although reference is made to the manner in which the physical alignment of the mobile and stationary fibers is accomplished in this description, it is the purpose of the invention to produce a switch in which the light carrying cores contained within the fibers are vertically and laterally aligned in appropriate light transmitting positions when the fibers are said to be aligned.

In this form of the single pole, double-throw (SPDT) configuration, and under the action of the bimorph drive signal, the bimorph 31 and the attached mobile fiber 23 move between limits set by lateral stops 54 and 55 which are engaged by the fiber 47. The lateral stops 54 and 55 are formed by two short members which may be short severed pieces 56 and 57 of a stripped fiber which have accurately cleaved inner ends 60 and 61 normal to the longitudinal axis of the pieces. The pieces 56 and 57, which are positioned immediately on the substrate surface 38, are secured in place by droplets of epoxy 62 and 63, respectively, to ensure that when the inner ends thereof are engaged by the fiber 47 of optic fiber 23, the end of the fiber 47 is laterally aligned with the end of either of cores 41 or 42. The manner in which lateral stops 54 and 56 are positioned will be described in more detail below.

The stops are positioned so that the mobile fiber travel limits are exactly opposite the two fixed fibers for maximum efficiency. As indicated above, a short space or gap l (FIG. 5) is left between the end of the movable optical fiber 23 and the fixed optical fibers 24 and 25 and the width of the gap may be in the order of 20 $\mu$m to allow for thermal expansion. This gap is small enough, however, so as to not significantly affect the coupling efficiency. As indicated, the cleaved ends of the fibers must be accurately formed and when the ends are held in the flexed position, as shown in an exaggerated form in FIG. 5, the end faces are preferably perpendicular to the axis of the fibers within 1°. When optic fibers having an outer jacket diameter, as shown at d in FIG. 5, of 0.010" or 250 $\mu$m, are used, the amount of jacket which is stripped, i.e. the exposed length of the fibers from the jacket to the fiber ends is preferably in the neighbourhood of 1 to 1.5 cm. The amount of flex of the fiber of the mobile fiber 23 and of the fixed fibers 24 and 25 typically forms a drop of about 60 micron over 1.5 cm. so as to result in a small contact angle. FIG. 5, by way of the fiber shown in dashed lines, illustrates the manner in which the fiber is bent out of true by having its outer circumferential surface at the end thereof in engagement with the reference surface, i.e. the substrate surface 38. The reference character X indicates the amount that the fiber is bent out of true, and this may be in the range of from 1 to 10 microns. The flexing of the fiber ends into contact with the substrate surface provides engagement of a short length of the circumferential surface of each fiber at the very end thereof. Thus, the end portion of the fiber 47 in the mobile fiber 23 remains in sliding contact with the substrate surface during movement and the engagement of the mobile fiber and of the stationary fibers with the substrate surface ensures accurate vertical alignment of the ends of the light carrying cores when in the transmitting position. The feature of having the fibers flexed means that the height above the reference surface of the fiber cores at the end of the fibers is immuned to small vertical movements at the point where the fibers of the fixed fibers are attached to the substrate such as at the epoxy 45. Such small vertical movements could be caused by the initial curing of the attaching epoxy or subsequent movement due to thermal expansion over the design range of −40° C. to +60° C. For a single mode fiber, for example, the outer diameter and core concentricities should be controlled to 1 μm for 0.2 dB of excess loss.

As indicated above, good cleave quality is important for a low loss switch. It is preferable to prepare the fiber ends with a good quality cleaver, and subsequently to being formed, the ends should be inspected by using a laser interferometer. It has been found that by rejecting cleave angles which are more than 1°, ie. where the plane of the end of the fiber is more than 1° from being exactly perpendicular to the longitudinal axis of the core, the excess loss due to poor cleaving can be kept under 0.4 dB.

Referring now to FIG. 6, it is preferable to include inside of the switch case 11, the necessary electronics 27 to provide the required bimorph wave forms given power supply voltages and control signals which may already be present on the user's premises, for example, a +15 V supply and a TTL control signal. The schematic as shown uses commercially available components and which may preferably be surface mounted. Element 66 is a Motorola DC-DC converter chip, MC 34063, which is used with a supplementary voltage booster in the form of a field effect transistor $Q_1$ sold under the Trade Mark HEXFET. The required high voltage is generated from the large inductive shut off spike when the current through the inductor and through $Q_1$ is shut off by the control oscillator in the converter chip. The peak of the spike is clipped by a diode $D_1$, and the energy is deposited onto the high voltage energy storage capacitor $C_2$. The convertor chip monitors the voltage on $C_2$ and enables operation of $Q_1$ as often as is necessary to replace the charge on the capacitor $C_2$. To cause the toggling of the polarity of the high voltage being applied to a non latching switch, transistor $Q_2$ causes an inversion of the customer control signal and then transistor $Q_3$ and transistor $Q_4$ gate the high voltage to the bimorph. In a latching switch arrangement, the $Q_2$ and $O_3$ stages are omitted and $Q_4$ simply gates the high voltage on and off.

Typically the mobile fiber 23 is over-driven by 10 to 30% such that an unrestrained fiber would move well beyond the lateral stop position. This overdrive ensures that the fiber is well seated against the lateral stops, and further that small changes in the bimorph deflection sensitivity can be tolerated. Such changes may be due to temperature, creep or hysteresis. Although the voltage over-driven bimorph tries to move the fiber beyond the lateral stop, the fiber is stiff enough so that if the lateral stops are positioned appropriately, the weak bimorph is stalled without significantly bending the fiber as it contacts the stops. If the lateral stops are placed at the end of the mobile fiber, as is shown in the enlargement of FIG. 4, then any slight bending of the fiber does not disturb the lateral position of the mobile fiber core with respect to the cores of the stationary fibers.

During the process of attaching the optic fibers and the stops 54 and 55, the mobile fiber 47 is affixed to the side surface 35 of the bimorph, and the fibers 41 and 42 of the stationary optical fibers are attached to the upper surface 38 of the substrate 37 with the epoxy. During the attaching steps, the optic fibers are flexed as described above. The lateral stops 56 and 57 are subsequently affixed by using coupling efficiency monitoring so as to laterally register the end points of the mobile fiber travel in the position of best coupling. Because the stops are installed after the optic fibers 24 and 25 have been affixed on the static side of the switch, the effects of any lateral movement or spreading of the static fibers during the epoxy curing stage become irrelevant.

Figure 7:
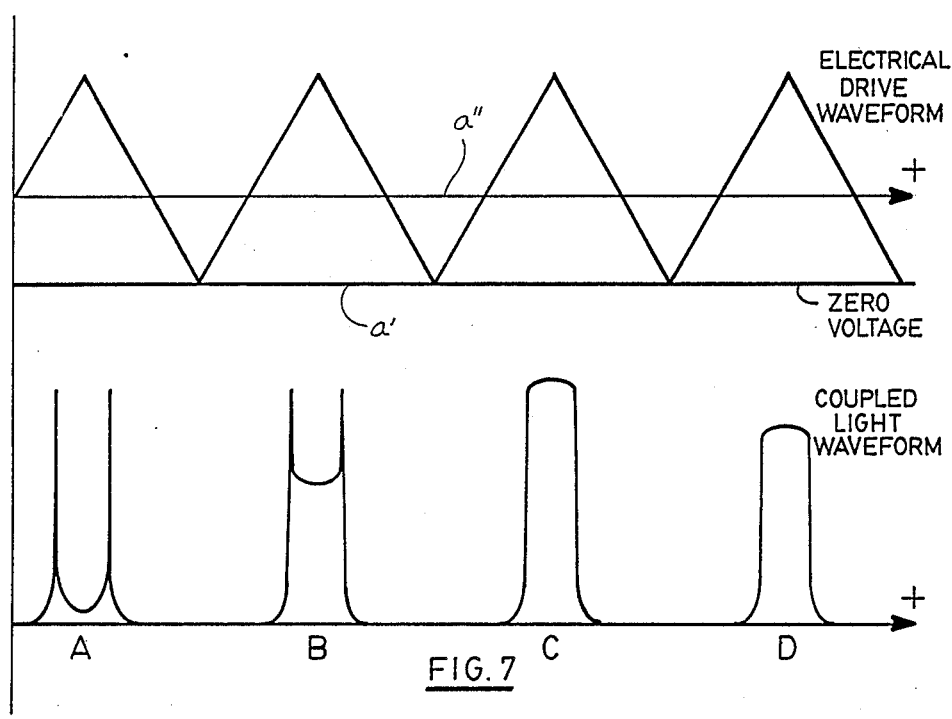
FIG. 7 is a graphical representation showing the relationship between the drive wave form and light wave form output obtained during a lateral positioning process for stops in the switch of the present invention.

In the positioning technique of the stops 54 and 55, a drive wave form, as illustrated at the top of FIG. 7 is applied to the input of the conversion electronics 27. The mobile optic fiber 23 is over-driven by a saw tooth wave form, the amplitude of which is such that the core of the mobile fiber initially sweeps well beyond the cores of the stationary or static fibers. In the upper part of FIG. 7 which shows the saw tooth wave form, the upper horizontal line a″ shows the zero voltage level used for a non latching switch whereas the zero voltage a′ level shown at the bottom of the saw tooth wave form is used for a latching switch. In a non latching switch, the position of the core of the mobile fiber, when the switch is not power activated, is midway between the cores of the static fibers. Thus, the saw tooth wave form provides a bipolar effect, swinging the mobile core a roughly equal amount on either side of its neutral position. In a latching switch, wherein the position of the mobile core when the bimorph is not activated, is opposite one of the cores of the static fibers, the saw tooth wave form is unipolar.

The bottom portion of the graph in FIG. 7 illustrates the coupled light wave form output which is achieved in the lateral example identified above. In case A, the coupled light wave form is that obtained when there is no lateral stop when the mobile fiber is swung to its activated position. It can be seen that the coupled light wave form consists of a pair of well resolved spikes. In the assembling process, the stop which is engaged by the mobile fiber as the bimorph is actuated, is moved inward from the side so as to start to block the fiber motion at its extreme travel. The coupled light wave forms shown at B represents a situation in which the lateral stop is still too far out. Whereas the fiber coupling will remain constant for the duration of a blocked overdrive, there is caused a plateau to develop in the coupled-like wave form. As the lateral stop is moved further in, the level of the plateau rises until it matches the height of the coupling spikes in the optimum position as illustrated at C. If the lateral stop is moved in too far, the height of the flat top coupling pulse will start to decrease as illustrated at D. The stop is secured, such as by the droplet of epoxy 62, when in the above-described optimum.

The epoxy used in fixing the fibers to the bimorph and the substrate surface and in fixing the fiber pieces to the substrate to form the lateral stops is preferably an ultraviolet curing epoxy. The use of this type of epoxy facilitates the placing of the parts in that final adjustment can be made after the droplet is applied and before the droplet is exposed to an ultraviolet beam, which would not be the case when normal air drying epoxy is used.

The piezoelectric ceramic bimorph of the cantilever type described above may typically be 0.021″×0.065″×1″ with 2 nF capacitance and having a 300 Hz resonant frequency. Such a bimorph may have 1 micron/volt deflection sensitivity so that ±60 volts will move one fiber diameter. The mechanical compliance is 30 microns per gram. The tested performance with such an arrangement gives a switching time of less than 3 msec. with less than 1 dB insertion loss for a single mode fiber or 0.5 dB for multimode fiber and provides 55 dB crosstalk. A low holding current, less than 10 nanoamperes, is required, and the switching energy is from 5 to 10 microjoules. The above described conversion electronics which is internal and integral with the switching mechanism can produce the required high voltage, i.e. 60-100 V, from the users normal signals and voltages, i.e. 15 V or 48 V supply, and TTL for the control signal.

Figure 8:
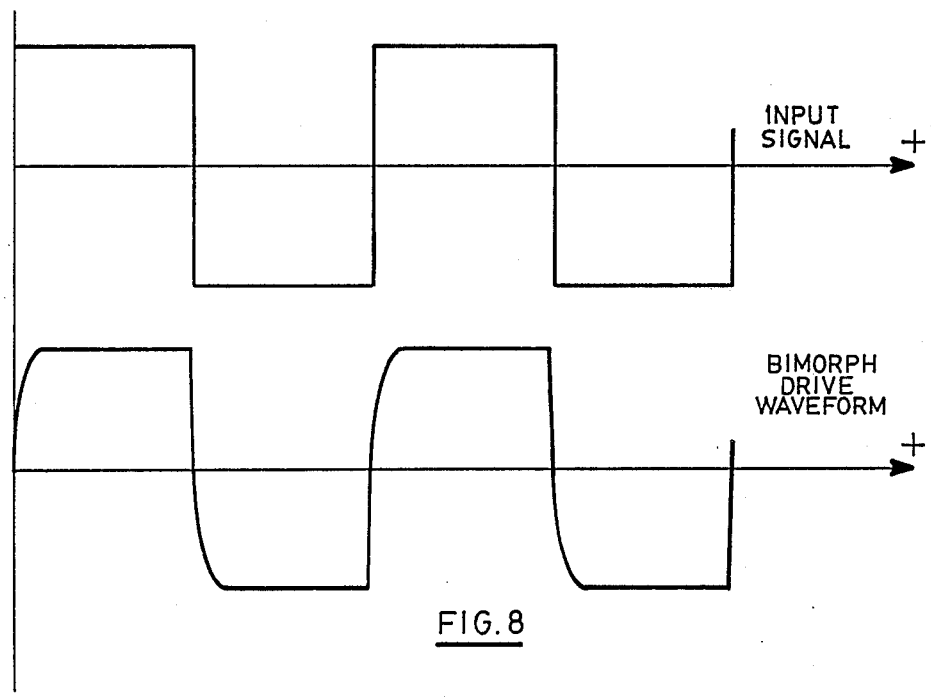
FIG. 8 is a graphical illustration of the bimorph drive waveforms.

Because the lower power actuator used is in the form of a long cantilever, it has a sharp mechanical resonance at a frequency which is typically 300 Hz and therefore can degrade the transient performance of the switch by causing ringing. Moreover, in addition to attempting overdrive of bimorph on engagement of the stripped mobile fiber with the stop, ringing is suppressed by having a rounded drive waveform applied to the bimorph, as illustrated in the bottom portion of FIG. 8. Because of the relatively large capacitance, namely 2 nF, of the bimorph, the illustrated shape of drive waveform is achieved by forming an appropriate RC low pass network using the bimorph capacitance C. The rounded portion of the waveform is encountered as the bimorph settles into the position in which the stop is engaged. As indicated, this suppresses the ringing.

As was described above, the switch which has been used as an example herein is a single pole, double throw configuration, i.e. an SPDT switch, but the same principles can be used in other types of switches, such as a half-bypass switch. In a half-bypass switch, there are two, laterally disposed, side-by-side mobile fibers which are attached to the bimorph so as to be shuttled together from a first position in which each of the two cores of the mobile fibers are aligned with two cores of fixed fibers to another position in which the core of one mobile fiber does not align with a core of a fixed fiber and the core of the other mobile fiber aligns with a core of a different fixed fiber than when at the first position.

Both of the above configurations can be made available in either the latching or non-latching versions. It has been explained above that in the latching version, the bimorph in one of its two positions is unpowered, and on the application of the high voltage power, the bimorph is driven to the other of its two positions. In the non-latching version, the unpowered switch rests midway between the two switch settings, and the bimorph moves to one of the settings, or the other, depending on the polarity of the applied high voltage drive.

Because of the good crosstalk and low loss characteristics of the switching device of the present invention, an SPDT switch is described above are usable in instruments which require access to one or two sources or, alternatively, to transmit light to one of two destinations.

It can be appreciated from the above that the present invention allows for an economical manufacture of an optic fiber switch which is capable of efficient transmission of light. None of the parts utilized in the switch require high tolerance machining and the assembly can be accurately carried out without the use of expensive equipment or highly skilled personnel. The switch is completely self-contained and the interior conversion electronics are capable of operating from voltages and control signals now normally available on a users premises.

Although the only embodiment of the invention has been described with reference to the drawings, alternative structures and methods of construction will be obvious to those skilled in the art without departing from the spirit of the invention as defined in the appending claims.

What we claim is:

1. In a fiber optic switch of the type including at least one stationary light conducting fiber and a mobile light conducting fiber having an end movable between a transmitting position aligned with the stationary fiber and a non-aligned position, a substrate having a smooth surface, means affixing an end portion of the stationary fiber to said substrate surface with a slight downward flex between said affixing means and said substrate surface to provide engagement of a portion of the circumferential surface of the fiber at the end of the fiber with said substrate surface, an actuator for movement in a plane above and substantially parallel to said substrate surface for moving the movable end of the fiber relative to said substrate surface between said positions, and means affixing said mobile fiber to a point on said actuator with a slight downward flex between said point and said substrate surface to provide engagement of a portion of the circumferential surface at the end of the mobile fiber with said substrate surface whereby said end portion of said fiber of said mobile fiber is in sliding contact with said substrate surface during movement and whereby the engagement of said fibers with the substrate surface provides accurate vertical alignment of the ends of the light carrying cores of the mobile and stationary fibers when in the transmitting position.

2. A switch of the type defined in claim 1, and including a stop on said substrate surface and positioned to be engaged by said mobile fiber in said transmitting position for providing lateral alignment of cores of the mobile and stationary fibers.

3. A switch of the type defined in claim 1, and including a pair of said stationary conducting fibers, affixed immediately side-by-side on said substrate surface and having end faces substantially in a common plane perpendicular to the substrate surface.

4. A switch as defined in claim 2, wherein said actuator is a bimorph.

5. A switch as defined in claim 4, and further comprising bimorph conversion electronics coupled to said bimorph.

6. A switch as defined in claim 2, wherein said actuator is a piezoelectric ceramic bimorph of the cantilever type, and further comprising bimorph conversion electronics coupled to said bimorph.

7. A switch as defined in claim 6, wherein said switch is contained within a case enclosing the bimorph and the conversion electronics.

8. A switch as defined in claim 7, and including a base plate within said case, said bimorph conversion electronics being mounted below said base plate, said substrate surface being formed by a glass substrate carried on said base plate, said bimorph being mounted in a plane above said glass substrate.

9. A switch as defined in claim 3, wherein said mobile fiber has an end face spaced by a short gap from the end faces of said stationary fibers.

10. A switch as defined in claim 9, wherein said short gap is of the order of 20 μm.

11. A switch as defined in claim 3, wherein said end faces are perpendicular to the axes of the fibers within 1°.

12. A switch as defined in claim 6, wherein said mobile fiber is moved by said bimorph between two positions, whereby the core of the mobile fiber is in the two positions with either of the cores of the pair of stationary fibers, and further comprising a pair of lateral stops above said substrate surface for defining the aligned lateral positions of the mobile fiber.

13. A switch as defined in claim 12, wherein said bimorph is arranged to be overdriven against said stops by about 10 to 30% to ensure that the mobile fiber is well seated against each stop.

14. A switch as defined in claim 13, wherein said conducting fibers are of the jacketed type, each of the stationary fibers and the mobile fiber having short end portions of the jacket stripped therefrom, said stationary fibers having jacketed portions affixed to the substrate surface.

15. A switch as defined in claim 14, wherein the jacketed portions of the stationary fibers are affixed in immediate side by side relation, the stripped fibers thereof being flexed together and downwardly and held onto said substrate, the stripped fibers being attached to the substrate surface by affixing means separate and spaced from affixing means of the jacketed portions of said fibers.

16. A switch as defined in claim 15 wherein the separate affixing means are droplets of epoxy.

17. A switch as defined in claim 14, wherein said mobile fiber has a jacketed portion thereof affixed to the bimorph at a point spaced from the separate point of affixment of the stripped fiber thereof to the bimorph.

18. A switch as defined in claim 1, wherein the amount of downward flex of the stationary fibers is approximately 60 microns over 1.5 cms.

19. A switch as defined in claim 12, wherein said lateral stops include short severed pieces of stripped fiber cleaved at one end to form mobile fiber engaging faces.

20. A switch as defined in claim 19, wherein said pieces of fiber are affixed to said substrate surface with said fiber engaging faces opposed to each other on opposite sides of said end of said mobile fiber.

21. A switch as defined in claim 20, wherein said pieces are affixed to said substrate surface by a droplet of epoxy.

22. A method of assembling a fiber optic switch of the type having at least one stationary conducting fiber and a mobile light conducting fiber having an end portion thereof movable between a transmitting position aligned with an end portion of a core of the stationary fiber and a non-aligned position, said mobile fiber being moved by an actuator mounted for movement in a plane above and substantially parallel to a smooth substrate surface, comprising the steps of:
affixing the end portion of the stationary fiber at a point spaced from an end surface thereof to said substrate surface with a slight downward flex between the affixing point and a portion of the circumference of the fiber engaging the substrate surface adjacent the end surface of the fiber, and
affixing the end portion of the movable fiber at a point spaced from an end surface thereof to said actuator with a slight downward flex between the affixing point on the actuator and a portion of the circumference of the mobile fiber engaging the substrate adjacent the end surface of the fiber, whereby the portion of the mobile fiber engaging the substrate surface is in sliding contact with the substrate surface.

23. The method defined in claim 22, and further comprising the step of positioning a lateral stop on said substrate surface in a position to be engaged by the movable fiber to thereby provide lateral alignment of the mobile fiber with the stationary fiber.

24. The method defined in claim 23, wherein said actuator is a bimorph coupled to the output of bimorph conversion electronics, and wherein the positioning of said lateral stop includes the steps of:
forming a stop element having a mobile fiber engaging end,
providing a drive wave form to the conversion electronics to produce an overdrive oscillation to the mobile fiber via the bimorph,
moving said element on the substrate surface inwardly until the mobile fiber engaging end thereof engages the oscillating fiber and commences to limit the amplitude of oscillation of the mobile fiber,
continuing to move said element inwardly while monitoring the coupled light wave form output, and
discontinuing the inward movement of said element and affixing said element to said substrate surface when a plateau of the monitored coupled wave form is at an optimum position.

25. The method as defined in claim 24, wherein said stop element is formed from a short severed piece of stripped fiber having an accurately cleaved end defining said mobile fiber engaging end.

26. The method as defined in claim 24, and wherein the stop element is affixed to the substrate surface by adhesive when the coupled wave form provides a reading indicating an optimum transmitting position of the mobile fiber relative to the stationary fiber.

27. The method as defined in claim 22, wherein the switch includes a pair of stationary conducting fibers, the mobile fiber being movable between two core aligned positions, one each with the stationary fibers, and said actuator is a cantilever type bimorph.
the end portions of the pair of stationary fibers being affixed immediately adjacent to each other and simultaneously to the substrate surface with the end surfaces thereof disposed in a common plane substantially perpendicular to the substrate surface.

28. The method of claim 27, wherein said mobile is adhered to said bimorph with a short gap being left between the end face of said mobile fiber and the end faces of said stationary fibers.

29. The method of claim 28, wherein said end faces of said fibers are maintained to within 1° to the perpendicular of the axis of said fibers.

30. The method as defined in claim 27, and further including the steps of positioning a pair of lateral stops on the substrate surface for defining the limit of travel of the mobile fiber and thereby establishing the two aligned positions.

31. The method as defined in claim 30, wherein said bimorph is coupled to the output of bimorph electronics, and wherein the positioning of the lateral stops includes the steps of:
forming a pair of stop elements having a mobile fiber engaging end,
providing a drive wave form to the conversion electronics to produce an overdrive oscillation to the mobile fiber via the bimorph,
(a) moving a first of said elements on the substrate surface inwardly until the mobile fiber engaging end thereof engages the oscillating fiber and commences to limit the amplitude of oscillation of the mobile fiber in the direction of said first element,
(b) continuing to move said first element inwardly while monitoring the coupled light wave form output in relation to the core of the stationary fiber on the side of the first element, discontinuing the inward movement of said first element and affixing said first element to said substrate surface when a plateau of the monitored coupled wave form is at an optimum position, and repeating steps (a) and (b) for affixing the second element in an opposed position.

32. The method as defined in claim 27, wherein said conducting fibers are of the jacketed type, and said bimorph is of the cantilever type, further comprising the steps of:

stripping short end portions of the jackets of the stationary fibers from the fibers, affixing the jacketed stationary fibers in side by side relation on the substrate surface by a droplet of adhesive applied to the jackets and substrate surface, flexing the stripped fibers downwardly and together and affixing to the substrate surface with another droplet of adhesive to the cores and substrate surface, stripping a short end portion of the jacket from the mobile fiber, affixing the jacketed mobile fiber to the cantilevered bimorph by applying a droplet of adhesive to the jacket thereof and the bimorph, and affixing the stripped end portion of the mobile fiber to the bimorph at a said point by applying another droplet of adhesive to the stripped end of the fiber and the bimorph.

33. The method as defined in claim 26, wherein said adhesive is an ultraviolet curing epoxy.

* * * * *